May 30, 1933.  J. A. H. BARKEIJ  1,911,874
INTERNAL COMBUSTION ENGINE
Original Filed Dec. 3, 1924   2 Sheets-Sheet 1
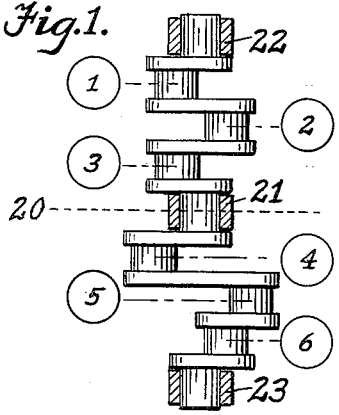
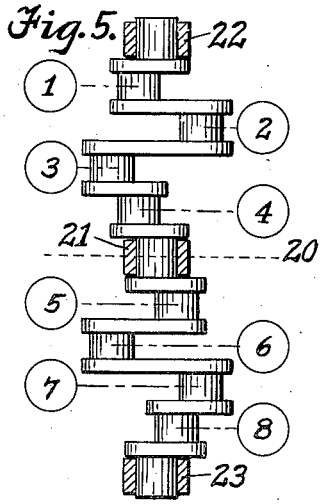
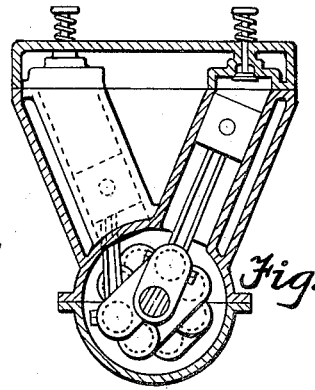
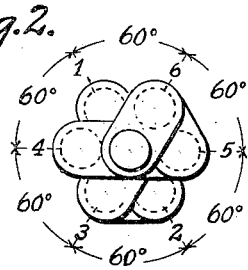
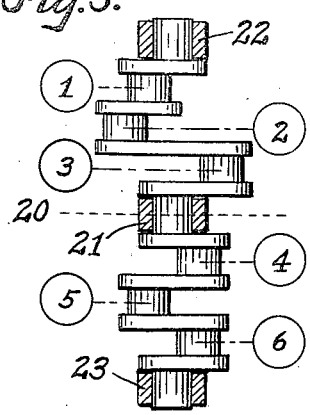
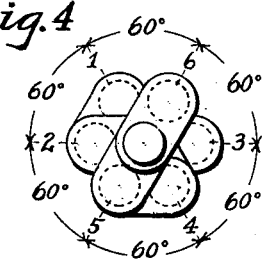
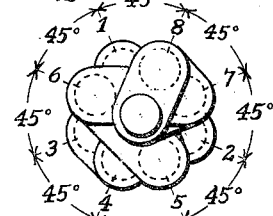
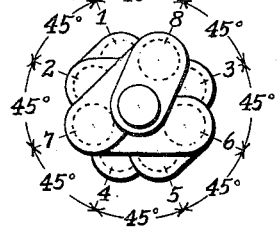
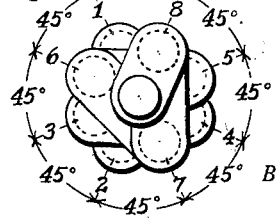
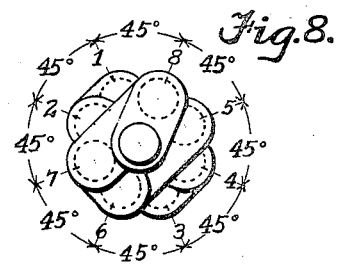
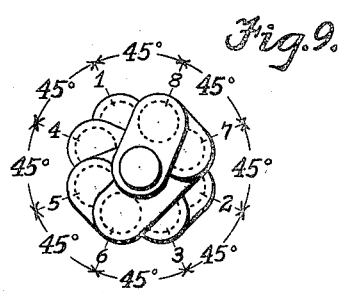
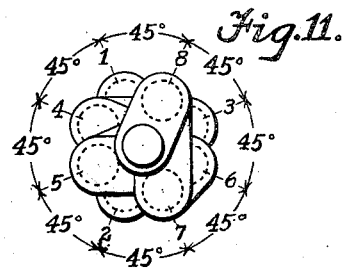
INVENTOR,
Jean A. H. Barkeij.
BY
ATTORNEY.

May 30, 1933.　　　J. A. H. BARKEIJ　　　1,911,874
INTERNAL COMBUSTION ENGINE
Original Filed Dec. 3, 1924　　2 Sheets-Sheet 2
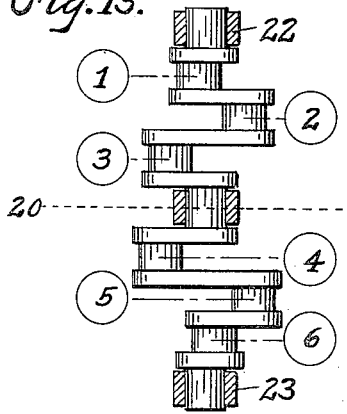
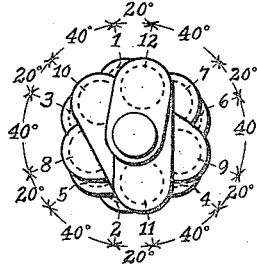
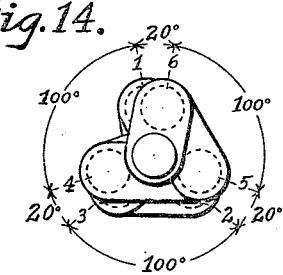
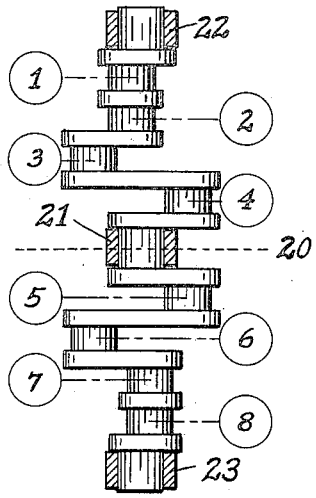
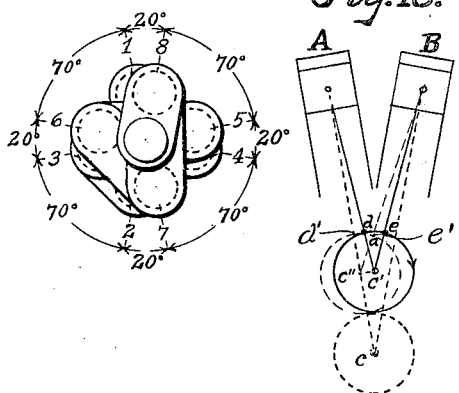
INVENTOR,
Jean A. H. Barkeij.
BY
ATTORNEY.

Patented May 30, 1933

1,911,874

UNITED STATES PATENT OFFICE

JEAN A. H. BARKEIJ, OF ALTADENA, CALIFORNIA

INTERNAL COMBUSTION ENGINE

REISSUED

Continuation of application Serial No. 753,609, filed December 3, 1924. This application filed December 17, 1929. Serial No. 414,809.

My invention relates to crank shafts for multiple cylinder, internal combustion engines and more particularly to V-type multiple cylinder engines. This application is a continuation of my application Ser. No. 753,609, filed Dec. 3, 1924.

One object of my invention is to provide a crank shaft, adapted for engines of the character described, which will make possible the construction of a short, compact and therefore relatively light weight engine and yet an engine which will have as many crank pins as cylinders.

Another object is to provide a crankshaft which will give a perfect balance of the reciprocating parts of the engine.

Another object is to provide a crank shaft which will permit the construction of an engine of the V-type with an angle between cylinder groups small enough so that a single casting will be possible and at the same time will provide ample room for valves and spark plugs.

Another object is to make possible equal firing and symmetrical arrangement of cylinder groups at a small angle on opposite sides of a vertical plane through the axis of the crank shaft.

Other objects and advantages will appear hereinafter and while I show herewith and will describe a preferred form of construction, I desire it to be understood that I do not limit my invention to such preferred form but that various changes and adaptations may be made therein without departing from the spirit of my invention as hereinafter claimed.

Referring to the drawings which accompany this specification and form a part thereof,—

Fig. 1 is a plan view of a crank shaft embodying the principles of my invention which has six crank pins and three bearings, the crank pins being adapted for a V-type engine having its cylinders arranged in two groups which make an angle of 60° with each other.

Fig. 2 is an end view of the crank shafts shown in Fig. 1.

Fig. 3 is a plan view similar to Fig. 1, except that a different arrangement of crank pins is shown.

Fig. 4 is an end view of the crank shaft shown in Fig. 3.

Fig. 5 is a plan view similar to Figs. 1 and 3 showing a crank shaft which has eight crank pins and three bearings, the crank pins being adapted for a V-type engine in which the two groups of cylinders are arranged at an angle of 45° with each other.

Fig. 6 is an end view of the crank shaft shown in Fig. 5.

Figs. 7, 8, 9, 10 and 11 are end views similar to Fig. 6, showing modified forms of crank shafts having eight crank pins.

Fig. 12 is a transverse sectional view of a V-type engine having cylinder groups arranged on a 45° angle with a crank shaft of the form shown in Fig. 8.

Fig. 13 is a plan view, similar to Fig. 1, of a crank shaft having six crank pins and three bearings adapted for a V-type engine with cylinder groups arranged on an angle of 20°.

Fig. 14 is an end view of the crank shaft shown in Fig. 13.

Fig. 15 is a plan view of a similar crank shaft having eight crank pins and three bearings and which is adapted for a V-type engine with cylinder groups arranged on an angle of 20°.

Fig. 16 is an end view of the crank shaft shown in Fig. 15.

Fig. 17 is an end view of a similar crank shaft having twelve crank pins.

Fig. 18 is a diagrammatic view of a small angled V-type engine illustrating the relation between cylinder angles and crank pin angles.

It is well known in general that the main advantage of multiple cylinder engines of the V-type over those of the straight type is that for a given number of cylinders the former may be made much shorter and lighter than the latter. This is due to the fact that the cylinders of the former type are arranged in two groups or series, with a fixed angle between them. In some forms of such engines the two series of cylinders are aligned transversely so that each crank pin of the crank shaft has two connecting rods joined to it. With my form of crank shaft one series of cylinders is arranged in staggered relation to the other and each connecting rod is joined to a separate crank pin. The crank shaft is therefore comparatively short, compact and rigid, requiring but few bearings, in consequence of which there is a minimum of torsion and vibration in it.

In crank shafts of this form having six, eight, or twelve crank pins, only three bearings are required,—two end bearings and a middle one. This makes it possible to increase the thickness of the crank arms and webs, as well as the length of the crank pins, thus providing greater bearing surface for the connecting rods.

The application of ball bearings to the crank shaft journals is also facilitated by this construction.

In order that the crank shaft with respect to a transverse vertical plane through the center of the middle bearing may balance the reciprocating parts and effect even firing, it is necessary to arrange the crank pins symmetrically with reference to said transverse plane. Furthermore, the torque or couple in a horizontal plane through the axis of the crank shaft, due to the vertical movement of the various pistons, can be minimized; first, by decreasing the angle between the cylinder groups, and, secondly, by a proper arrangement of the crank pins with reference to each other about the axis of the crank shaft.

Such symmetrical arrangements of a crank shaft for a six cylinder V-type engine, having its cylindrical groups arranged on an angle of 60°, are shown in Figs. 1, 2, 3 and 4, and for a similar engine having its cylinders arranged on an angle of 20°, in Figs. 13 and 14. Likewise symmetrical arrangements of a crank shaft for an eight cylinder V-type engine having its cylinder groups arranged on an angle of 45° are shown in Figs. 5, 6, 7, 8, 9, 10 and 11, and for a similar engine with an angle of 20° between its cylinder groups, in Figs. 15 and 16.

Fig. 17 shows a symmetrically arranged crank shaft for a twelve cylinder engine with an angle of 20° between its cylinder groups.

In Figs. 1, 3, 5, 13 and 15, the dotted line 20 indicates the transverse vertical plane through the middle bearings 21 of the crank shafts, 22 and 23, being the end bearings.

In Figs. 1 and 2 the series of crank pins 1, 3 and 5 are at an angle of 120° to each other and likewise the series 2, 4 and 6, but the first series is at an angle of 60° to the second series; pin 1 of the first series appearing adjacent to pin 6 of the second series in the end view. The first series, as arranged in these figures, reads progressively counter-clockwise, and the second clockwise. With this arrangement the couple created about the center of the crank shaft in a horizontal plane by the two up-going pistons connected to pins 1 and 6, is partly compensated for by the couple created by the two down-going pistons connected to pins 2 and 5. The couple in the transverse vertical plane is smaller than the aforementioned couples and is compensated in the same way. This condition obtains because of the fact the pins 2 and 5 and 3 and 4, are approximately the same distance from the center of the crank shaft as pins 1 and 6.

In Figs. 3 and 4 the same conditions as to balance obtain, the only difference being that the pins are arranged in a reverse direction in both series.

In Figs. 5 and 6 the pins in the series 1, 3, 5 and 7 and likewise those in the series 2, 4, 6 and 8 are at right angles to each other while the first series is at an angle of 45° to the second. Here again, pin 1 appears adjacent to pin 8 in the end view, as seen in Fig. 6. In the manner explained above, a degree of compensation obtains between 1 and 8 as opposed to 4 and 5, and between 3 and 6 as opposed to 2 and 7. The degree of compensation is gradually increased as illustrated by the improved arrangements shown in Figs. 7 to 11 inclusive.

It is, however, possible to make three other crankpin arrangements, which are a little inferior to those shown in Figs. 7–11 for the reason that a small couple is created in a horizontal plane. However, in these arrangements, which were superfluous to be shown, the fundamental arrangement of the crankpins 1, 3, 5, 7 at an angle of 90° to each other is maintained, and the same arrangement at 90° to each other for crankpins 2, 4, 6, 8.

In the three types shown in Figs. 6–11 the highest and lowest numbered crankpins, and the next highest and next lowest numbered crankpins etc., are at an equal distance from a vertical plane transverse to the axis of the crankshaft in the approximate middle thereof. In other words crankpins 1 and 8, 2 and 7, 3 and 6, 4 and 5 are at an equal distance from the transverse plane shown in Figs. 1, 3, 5, 13, 15 at 20. It is, however, equally possible to apply the same principle for the 8, 12, 16 etc., cylinder with respect to two or more planes of such symmetry, as 8 cylinders can be divided in two groups of four; a 12 cylinder in two groups of 6 cylinders, or three groups of 4 cylinders; a 16 cylinder in two groups of 8 cylinders (arranged as in Figs. 6–11), or four groups of 4 cylinders. In the first type thereof the crankpins 1 and 4, and 2 and 3, will be at equal distances from such a transverse plane between cylinders 2 and 3, and the angle between the individual pins of these two pairs will be equal to the cylinder angle, i. e. 45° as shown in Figs. 6–11, or 20° as shown in Fig. 16. The same angle and distances will be maintained between the crankpins 5 and 8, and 6 and 7 with respect to a transverse plane between cylinders 6 and 7.

In the second type the two groups of crankpins are 1, 6, 2, 5, and 3, 8, 4, 7; the same angle and distances being maintained with respect to such transverse planes between respectively cyls. 3 and 4, and cyls. 5 and 6. The third type is shown in the copending application 753,608, now Patent 1,722,950, July 30, 1929, in a variation, which is fundamentally the same as the present type in this application. If the crankpins 1 and 7 and 3, 5 are at an equal distance of a transverse plane between cylinders 4 and 5, and crankpins 2 and 8, and 3, 6 at equal distances from a similar plane between the same cylinders 4 and 5, it is preferred, as shown in the copending application to align the crankpins 1 and 7, 3 and 5, 2 and 8, 4 and 6, so that the said first crankpins are in one plane, the second set of four crankpins in the other plane, said planes at an angle equal to the cylinder angle. If the crankpins 1, 7, and 3, 5, and 2, 8, and 4, 6 are set at the cylinder angle, a certain balance of the reciprocating parts is also obtained. Therefore applicant does not confine himself strictly to the types shown, but lays claim 1st. to the arrangements of the crankpins 1, 3, 5, 7 and crankpins 2, 4, 6, 8 at 90°, 2nd. to the staggered arrangement of the cylinders alternately in two planes (at an angle, or parallel as we will see later, as a limiting case), 3rd. to said alternately staggered cylinder arrangement at an angle smaller than 720° divided by twice the number of crankpins, combined with the crankpin arrangement under 1, or any other crankpin arrangement in which four crankpins are at right angles to each other, the other four crankpins at the same angle, both sets at the cylinder angle to each other, so that two crankpins reach their top positions at the same time, the interval between the four pairs of crankpins being equal, resulting in equal firing, 4th. to the equivalent arrangements of the four cylinder type, in which the crankpins 1 and 4 are at the cylinder angle to each other, and also crankpins 2 and 3; so that crankpins 2 and 4 are in one plane, crankpins 1 and 3 in the other plane, the angle between said latter two planes being the cylinder angle. This type is exactly the same as that for the two groups of four cylinders 1, 2, 3, 4 and 5, 6, 7, 8, described as the type superfluous to be shown for the eight cylinder, 5th. to the equivalent arrangements of the 10, 16 cylinder, in which half of the crankpins the even numbered, are arranged at an angle of 360° divided by half the number of crankpins; the other half, the uneven numbered, being arranged at the same angle, the two groups again being arranged at the cylinder angle, (or greater than the cylinder angle in case the cylinders are arranged in two planes, parallel to each other, as we will see later).

Fig. 12 illustrates an engine of the type under consideration, having cylinder groups arranged on an angle of 45° and made in a single casting. But it is understood that engines having a smaller angle, arranged for crank shafts shown in Figs. 13 to 18 inclusive, may be built to even better advantage with respect to balance and even firing. Excepting this difference in the arrangement of crank pins to conform to an engine having cylinder groups arranged on an angle of 20°, Figs. 13 and 14 correspond to Figs. 1 and 2; likewise Figs. 15 and 16 correspond to Figs. 5 and 10. Fig. 17 illustrates that the same principle is applicable to a crank shaft for a 12 cylinder engine with a 20° angle between the cylinder groups.

If the angle between the two cylinder groups is decreased to 20°, as shown in Figs. 13–18, the angle between crankpins 1, 6 and 2, 5, and 3, 4 is decreased to 20°. The same condition obtains for the four, 10, 12 and 16 cyl. type.

It is understood that the dovetailed arrangement of the cylinders, as shown in Fig. 5 of the copending case 753,608, Patent 1,722,950, can be equally applied on the types shown in this application.

In Fig. 17 the crankpins 1–12 are arranged similarly like in Figs. 10, 11 for the eight cylinder type, but it is, of course, understood that these crankpins may be arranged with respect to two transverse planes 20, as explained verbally for the eight cylinder type, and as shown in Patent 1,722,950.

The diagram in Fig. 18 shows an engine having its cylinder groups arranged on an angle of 20°. It is evident that if the crank shaft were placed with its axis coinciding with the line of intersection of the two axial planes of the cylinder groups, viz., at point $c$, the connecting rods would be abnormally long. By placing the crank shaft above $c$, however, as at the point $c'$ in the same vertical plane with $c$, the length of the connecting rods will be reduced to the normal length; but the possibility of equal firing will then be lost, unless the crankpin angle is increased. In order to restore this possibility, the angle $a$, between crankpins $d$ and $c$ will necessarily exceed somewhat the angle between the cylinder groups, as shown.

The angle of the crankpins and respective crankarms should be such, that if crankpins reach their top position with respect to their respective cylinders, that they form a straight line, both pistons reaching their top position simultaneously.

If the axis of the crankshaft is placed at $c''$, in the axial plane of cylinder group A, it will be offset with respect to group B only. In this case the crankshaft should rotate in a clockwise direction to obtain the favorable piston pressure on the left wall of the cylinders of group B.

It will be further readily seen that if the angle between the two groups A and B is reduced to zero, that the angle between the individual pins of said pairs of crankpins is, of course, not reduced to zero, but retains a certain angle, due to said two planes, and offset.

If the axis of the crankshaft is placed at $c''$, in the axial plane of cylinder group A, it will be offset with respect to group B only. In this case the crankshaft should rotate in a clockwise direction for greatest efficiency, and if in this case the cylinder angle is reduced to zero, the cylinders being parallel to each other in two planes, the angle between the individual pins of said pairs, will be greater than when the axis was placed midway at $c'$ the two cylinder planes. (See my application 152,708, Patent 1,776,760.)

If the cylinder angle approaches zero, the cylinders may 1st approach the in line arrangement, in which case the angle between crankpins 1, 8, and 2, 7, etc. is proportionate to the cylinder angle; or 2nd the cylinders may stay in staggered arrangement in two parallel planes, so that the said crankpin angle has to be greater than in the former case to compensate for the distance between the two parallel cylinder planes. The intersection however of the two cylinder planes happens at an infinite distance at $c$ according to Einstein, but the two points $c'$ and $c''$ are acceptable for anybody.

It will readily be seen that the angle between cylinder groups A and B may be reduced to zero in one plane or two planes and that the construction suggested above, in which the axis of the crankshaft as placed at $c'$ will still be practicable. Similarly for $c''$.

Resuming the main characteristics:

1. The cylinders and respective crankpins are numbered in longitudinal direction, the even numbered cylinders being in one group, the uneven numbered in the other group, alternatively, said groups located in two planes at an angle, or parallel.

2. The cylinders at least 4, grouped in two planes, are at an angle, or in two planes parallel to each other.

3. The crankpins are preferably grouped so that the highest numbered crankpin is angularly adjacent to the lowest numbered crankpin, the next highest to the next lowest, and so on for engines with more than four cylinders. (If they are aligned in pairs, another limiting case is obtained as claimed in Patent 1,776,760.)

4. It is preferred to place the crankshaft axis in the plane of only one group, in the left group, if the engine rotates clockwise.

5. It is understood, that the engine may operate on a two stroke or four stroke cycle, the latter being preferred for the present time.

6. It is further understood, that the number of intermediate bearings may be greater than one, applying thereby the form of crankshaft, shown in my Patent 1,595,372, without increasing the length of the crankshaft, by constructing the intermediate crankarms in the form of discs of such a diameter that they circumscribe the crankpins, so that the crankshaft may be introduced to and removed from said engine in the direction of the axis of the crankshaft.

7. It is further understood, that if more than two rows of cylinders are applied radially, that the angle between any two rows of cylinders should not coincide with more than two crankpins at the time, otherwise more than two pistons reach their top positions simultaneously, and more than one cylinder has to fire at the same time for the fourstroke type, (for the two stroke type more than two cylinders will fire at the same time), thereby reducing the torque for a given number of cylinders.

8. The same condition of 7 applies, if cylinders are sandwiched between the staggeredly arranged cylinders, applying thereby the crankpin arrangements, shown in the drawings. In this case again, only two pistons should reach their top positions simultaneously at the time, to obtain maximum torque.

I claim:

1. In an internal combustion engine of the V type, having 8 cylinders arranged in two groups of four cylinders in two planes at an angle equal or smaller than 720° divided by twice the number of cylinders, the even numbered cylinders in one plane, the uneven numbered cylinders in the other plane, said cylinders numbered successively 1 to 8, a crankshaft having as many crankpins as cylinders, arranged in as many radial planes as the number of crankpins or cylinders, said crankpins arranged in two groups of four crankpins, each group composed of two outer crankpins, the pistons of which reach their top positions simultaneously, and composed of two inner crankpins, the pistons of which reach their top positions equally simultaneously, the pistons belonging to only one of said pairs reaching their top positions at the same time.

2. The combination of claim 1, in which the axis of said crankshaft is placed in the plane of the left cylinder group, if the engine rotates clockwise, and above the line of intersection of the planes of the two cylinder groups, the angle between the two outer and the two inner crankpins of each group of four crankpins being increased to an angle greater than that between the cylinder groups in order to effect equal firing intervals in the cylinders of said engine, operating on a fourstroke cycle.

3. An internal combustion engine, a crankshaft with six crankpins, an equal number of cylinders arranged at an angle smaller than 720° divided by twice the number of crankpins, said cylinders arranged alternately in said two planes in staggered relation so that cylinders 1, 3, 5 appear in one plane, cylinders 2, 4, 6 in the other plane, said crankpins and cylinders with even and uneven numbers corresponding with each other, said even numbered crankpins arranged at an angle of 720° divided by the number of crankpins, said uneven numbered crankpins arranged at the same angle; said two groups of crankpins arranged at the angle of the cylinder groups so that only two pistons at the time, one in each group, reach their top positions simultaneously said crankpins being arranged so that in a six cylinder engine crankpin 1 is radially adjacent to crankpins 6, 2 to 5, 3 to 4.

4. In an internal combustion engine, a crankshaft having at least 8 crankpins and a multiple of two, an equal number of cylinders arranged at an angle smaller than 360° divided by the number of crankpins, said cylinders arranged alternately in staggered relation in said two planes so that cylinders 1, 3, 5, 7, etc. appear in one plane, and cylinders 2, 4, 6, 8, etc. in the other plane alternatively in staggered relation, said crankpins corresponding to the even numbered cylinders arranged at an angle of 360° divided by half the number of crankpins, said crankpins corresponding to the uneven numbered cylinders arranged at the same angle as said even numbered crankpins; said two groups of crankpins arranged at the cylinder angle, pistons connected to said crankpins, only two pistons at the time reaching their top positions simultaneously one in each group, the crankpin being arranged so that crankpin 1 is radially adjacent to crankpins 8, 2 to 7, 3 to 6, 4 to 5.

5. In an internal combustion engine, having a crankshaft with 8 crankpins, said crankpins successively numbered and so arranged on 8 radii that crankpins 1, 3, 5, 7 are at 90°, and also crankpins 2, 4, 6, 8 to each other so that crankpin 1 may appear adjacent to any crankpin of said second set of four crankpins, except 2, to retain the proper balance in said engine, a plurality of cylinders arranged radially and alternately in staggered relation around the axis of said crankshaft in two rows, at an angle smaller than 360° divided by the number of crankpins, the angle between the individual crankpins of each pair of radially adjacent crankpins being equal to the angle between two adjacent rows of radially arranged cylinders, only two pistons in two different rows of cylinders reaching their top positions simultaneously, the interval between pairs of pistons reaching their top positions being equal.

6. An internal combustion engine having a plurality of rows of cylinders arranged radially with respect to the axis of a crankshaft having eight crankpins arranged in two groups, said crankpins numbered successively 1 to 8, crankpins 1, 3, 5, 7 arranged at an angle of 90° and similarly crankpins 2, 4, 6, 8, at 90° on 8 radii so that crankpin 1 may appear radially adjacent to any crankpin of said second set of four crankpins, except crankpin 2, in order to retain the proper balance in the reciprocating parts of said engine, pistons in said cylinders connected with connecting rods to said crankpins, said cylinders and crankpins arranged at such an angle to each other that only two pistons, one in one row and one in another row, reach their top positions simultaneously, the interval between each pair of pistons reaching their top positions being equal.

7. The combination of claim 3, in which the angle between said two groups of crankpins is increased to effect equal firing, when the axis of said crankshaft is placed in the left cylinder group above the line of intersection of the planes of the cylinders, said shaft rotating clockwise.

8. The combination of claim 4, in which said two cylinder groups are casted in a single cylinder block, the axis of said crankshaft placed above the intersection of the cylinder planes and placed in the left cylinder plane when said crankshaft rotates in clockwise direction, the angle between said two groups of crankpins increased corresponding to said crankshaft position in order to effect equal firing intervals according to the accompanying description.

9. In an internal combustion engine of the V type, having four cylinders arranged in one plane and four cylinders in a second plane alternate in staggered relation at an angle less than 360° divided by the number of cylinders, a crankshaft having eight crankpins corresponding to said eight cylinders, said crankpins adjacent to each other in eight radii so that crankpin 1 appears adjacent to 8, 2 to 7, 5 to 4, 6 to 3, two pistons in two cylinders, one in each of said two planes, reaching their top position simultaneously, the intervals of said pistonpairs reaching their top-positions, being 360° divided by half the number of crankpins, the order of said crankpins being in clockwise direction, 1, 8, 5, 4, 7, 2, 3, 6, the angle between the individual pins of said pairs being equal to the cylinder angle so that only two pistons at the time reach their top positions simultaneously.

10. The combination of claim 9, in which the axis of the crankshaft is placed above the intersection of the cylinder-planes, said cylinders cast in a single casting embracing all cylinders.

11. In an internal combustion engine of the V type having eight cylinders, arranged in two groups in two planes the cylinders alternatively arranged in said two planes, a crankshaft having eight crankpins arranged so that the crankpins 1 and 8, 2 and 7, 3 and 6, 4 and 5, reach top or bottom positions simultaneously, one pair at the time.

12. The combination of in an internal combustion engine, of at least four cylinders arranged in two planes in two groups, at an angle smaller than 360° divided by the number of crankpins, the even numbered crankpins arranged at an angle of 360° divided by half the number of crankpins, the uneven numbered arranged at the same angle said crankpins arranged in as many radial planes as there are crankpins, said cylinders arranged alternatively in said two planes in as many transverse planes as there are cylinders perpendicularly to the crankshaft axis; said crankpins in number equal to the cylinders.

13. An internal combustion engine having two rows of cylinders arranged in two planes, a crankshaft having as many crankpins as there are cylinders in said two planes, the axis of said crankshaft located in the plane of the left cylinder group, when said crankshaft rotates in clockwise direction, half of said crankpins corresponding with half of the number of said cylinders in one plane, arranged symmetrically, the other half of said crankpins corresponding with the other half of said cylinders in the other plane, also arranged symmetrically, said two sets of crankpins radially offset from each other so that two pistons in two cylinders, belonging to said two planes, reach their top positions simultaneously, the interval between the pairs of pistons reaching top positions simultaneously being regular, said crankpins arranged in as many radial planes as there are crankpins.

14. The combination of claim 13, in which said one half number of crankpins is arranged at an angle of 360° divided by half the number of cylinders, the other half number of cylinders being similarly arranged, said two sets of crankpins offset from each other at an angle equal to the angle of the two cylinder planes, so that two pistons at the time reach their top positions simultaneously, said crankshaft placed with its axis above the line of intersection of the cylinder planes, said crank pins arranged in as many radial planes as there are crankpins.

15. In an internal combustion engine having cylinders arranged in two groups in two planes, a crankshaft, two crankpins of which are connected to pistons which reach their top or bottom positions simultaneously, said two crankpins having an angle substantially greater than the angle between the cylinder groups.

16. In an internal combustion engine having cylinders arranged in two planes, a crankshaft, two crankpins of which are connected to pistons, which reach their top or bottom positions simultaneously, said two crankpins having an angle substantially greater than the angle between the cylinder groups, the axis of said shaft being placed in the axial plane of one cylinder group, said crankpins arranged in as many radial planes as there are crankpins.

17. In an internal combustion engine, having cylinders arranged in two groups at an angle, a crankshaft with as many crankpins as cylinders, the axis of said crankshaft laying in the plane of one of the cylinder-groups, and above the line of intersection of the planes of the two cylinder groups, said crankshaft having 8 crankpins so arranged that crankpins 1 and 8, 2 and 7, 3 and 6, 4 and 5 reach their top or bottom positions simultaneously one pair at the time, said crankpins arranged in as many radial planes as there are crankpins.

18. An internal combustion engine having at least four cylinders and a multiple of two arranged in two groups in two planes at an angle equal to or smaller than 360° divided by the number of crankpins, having a crankshaft with as many crankpins as there are cylinders, said crankpins and cylinders numbered successively in longitudinal direction so that the even numbered appear in one plane, the uneven numbered in the other plane, said crankpins arranged in as many radial planes as there are crankpins, said cylinders arranged alternatively in staggered relation in said two planes, said even numbered crankpins radially arranged at an angle of 360° divided by half the number of crankpins, said uneven numbered crankpins similarly arranged; said two groups arranged radially at the angle of said two cylinder groups so that crankpins 1 and 4 the highest and lowest numbered crankpins are adjacent to each other, and also crankpins 2 and 3 the next highest and next lowest crankpins; the respective pistons connected to said pairs of crankpins reaching their top positions simultaneously, two pistons at the time in two different cylinder planes.

19. An internal combustion engine having a crankshaft with at least six crankpins and a multiple of two, and an equal number of cylinders arranged at an angle equal to or smaller than 360° divided by the number of cylinders, said crankpins and cylinders numbered successively in longitudinal direction so that the even numbered cylinders appear in one plane, the uneven numbered cylinders in the other plane, said cylinders arranged alternatively in staggered relation in said two planes, said even numbered crankpins arranged radially at an angle of 360° divided by half the number of crankpins, said uneven numbered crankpins similarly arranged, said two groups of crankpins arranged at the angle of said two cylinder groups, so that the highest and lowest numbered crankpins, i. e. in a six cylinder 1 and 6, appear radially adjacent to each other, and also the next highest and next lowest numbered crankpins, 2 and 5; and also the next highest and next lowest numbered crankpins 3 and 4; the respective pistons attached to said pairs of crankpins reaching their top positions in two different radial groups simultaneously, two pistons at the time.

20. An internal combustion engine having a crankshaft with at least eight crankpins and a multiple of two, and an equal number of cylinders arranged at an angle equal to or smaller than 360° divided by the number of cylinders; said crankpins and cylinders numbered successively in longitudinal direction so that the even numbered cylinders appear in one plane, the uneven numbered in the other plane, said cylinders arranged alternatively in staggered relation in said two planes; said even numbered crankpins arranged radially at an angle of 360°. divided by half the number of crankpins, said uneven numbered crankpins similarly arranged; said two groups of crankpins arranged at the angle of the two cylinder groups, so that the highest and lowest numbered crankpins, i. e. in an eight cylinder 1 and 8, appear radially adjacent to each other, and also the next highest and lowest numbered crankpins 2 and 7, and also the next highest and lowest numbered crankpins 3 and 6, and also the next highest and lowest numbered crankpins 4 and 5; the respective pistons attached to said pairs of crankpins reaching their top positions simultaneously, two pistons at the time.

21. The combination of claim 18, in which the angle of the two cylinder groups is reduced to a parallel construction of the cylinders in said two groups, retaining thereby the arrangement of said crankpins on as many radii as there are crankpins in said engine and in the same order; said pistons reaching their top positions in the same pairs.

22. The combination of claim 19, in which the angle between the cylinder groups is reduced to its limit, the parallel construction of the cylinders of said two groups, retaining thereby the arrangement of said crankpins on as many radii as there are crankpins on said crankshaft and in the same order; said pistons reaching their top position in the same pairs.

23. The combination of claim 20 in which the cylinder angle is reduced to its limit, the cylinders being arranged in two planes parallel to each other; said crankpins remaining arranged on as many radii as there are crankpins on said crankshaft and in the same order; said pistons reaching their top positions in the same pairs with the same intervals.

24. An internal combustion engine, having 8 cylinders arranged in two groups of four cylinders, cylinders 1, 3, 5, 7 in one group, cylinders 2, 4, 6, 8 in the other group, said cylinders numbered successively in longitudinal direction 1 to 8, said two groups arranged at an angle equal or smaller than 720° divided by twice the number of crankpins in said engine; a crankshaft having the same number of crankpins, equally numbered in longitudinal direction; said crankpins so arranged that crankpins 1, 3, 5, 7 are at an angle of 90° in crossform to each other, and crankpins 2, 4, 6, 8 arranged similarly; the angle between these two groups of crankpins so arranged that their angle conforms to the angle of the cylinder groups; said crankpins arranged in two groups of four crankpins, the outer and inner crankpins of each group of four crankpins reaching respectively their top and bottom positions simultaneously.

25. In an internal combustion engine, having a crankshaft, and 8 or less cylinders, but a multiple of two, arranged in two groups of four cylinders at an angle equal to or smaller than 720° divided by twice the number of crankpins on said crankshaft; cylinders 1, 3, 5, 7 arranged in one group parallel to each other, cylinders 2, 4, 6, 8 arranged parallel to each other in the other group; said cylinders alternately arranged in said two planes in eight planes transverse to the axis of said crankshaft, said cylinders numbered successively in longitudinal direction 1 to 8; a crankshaft having the same number of crankpins, equally numbered in longitudinal direction, said crankpins so arranged that crankpins 1, 3, 5, 7 are at an angle to each other of 720° divided by the number of crankpins, and crankpins 2, 4, 6, 8 at the same angle; the angle between these two groups of crankpins being equal to the cylinder angle; pistons connected to said crankpins so that the pistons connected to the crankpins of the innermost pair of cylinders reach their top positions simultaneously, the individual crankpins and cylinders of said last pair belonging, one to each group of cylinders.

26. An internal combustion engine having a plurality of rows of cylinders arranged radially with respect to the axis of a crankshaft, having six crankpins arranged in two groups, said crankpins numbered successively 1 to 6, crankpins 1, 3, 5 arranged at an angle of 120°, and similarly crankpins 2, 4, 6 arranged at 120° on six radii, so that crankpin 1 appears radially adjacent to crankpins 6, 2 to 5, and 3 to 4, in order to retain the proper balance of the reciprocating parts of said engine, pistons in said cylinders connected with connecting rods to said crankpins, said cylinders and crankpins arranged at such an angle to each other that only two pistons, one in one row and one in another row reach their top positions simultaneously, the interval between each pair of pistons reaching their top position being equal.

27. The combination of claim 12, in which the axis of said crankshaft is placed above the intersection of the axes of the cylinder groups and parallel thereto, but within said planes.

28. The combination of claim 18, in which the axis of said crankshaft is placed above the intersection of the axes of the cylinder groups and parallel thereto, but within said planes.

29. The combination of an internal combustion engine of at least four cylinders arranged alternately in staggered relation in two planes at an angle less than 360° divided by the number of cylinders, a crankshaft below said cylinders having as many crankpins as cylinders, said crankpins arranged on as many radii as there are crankpins, the axis of said crankshaft placed above the intersection of the axes of the planes of the two cylinder groups, but within said planes, and in which the crankpins of two pistons, one of which is in one plane the other in the other plane, have an angle exceeding that of the angle between the cylinder groups.

30. The combination of an internal combustion engine having at least 8 cylinders in two planes, at an angle less than 720° divided by the number of cylinders, 4 cylinders in each plane, said cylinders arranged staggered in alternate relation, a crankshaft below said cylinders having as many crankpins as cylinders, said crankpins arranged on as many radii as there are crankpins, the axis of said crankshaft placed above the intersection of the axes of the cylinder planes, said cylinders further so arranged that they are alternately staggered.

31. In an internal combustion engine having at least 8 cylinders in two planes at an angle less than 720° divided by the number of cylinders, at least 4 cylinders in each plane, said cylinders arranged in staggered relation so that they are alternately staggered, a crankshaft below said cylinders having as many crankpins as there are cylinders, and in which the axis of said crankshaft is placed above the intersection of the planes of the cylinders, but parallel therewith and within the planes of said two cylinder groups, said crankpins further so arranged that pairs of crankpins have such an angle that two pistons, one in each group reach their top positions simultaneously.

32. The combination of an internal combustion engine having cylinders arranged alternately in staggered relation at an angle less than 720° divided by the number of cylinders, a crankshaft positioned above the intersection of the planes of said cylinder groups and within said two planes, said crankshaft extending parallel with respect to said planes and intermediate the line of intersection of said planes and the engine cylinders, and in which said crankshaft has as many crankpins as there are cylinders on said crankshaft, two crankpins of which are so arranged that their corresponding pistons one in each plane, reach their top positions simultaneously.

33. In an internal combustion engine having cylinders arranged in two groups in two planes, a crankshaft, two crankpins of which are connected to pistons, which reach their top or bottom positions simultaneously, said two crankpins having an angle substantially greater than the angle between the cylinder groups.

34. In an internal combustion engine having cylinders arranged in two planes, a crankshaft, two crankpins of which are connected to pistons which reach their top or bottom positions simultaneously, said two crankpins having an angle substantially greater than the angle between the cylinder groups, the axis of said shaft being placed in the axial plane of one cylinder group.

35. In an internal combustion engine of the V type having eight cylinders arranged in two groups in two planes, a crank shaft having eight crankpins arranged so that the crankpins 1 and 8, 2 and 7, 3 and 6, 4 and 5 reach their top or bottom positions simultaneously, one pair at the time.

36. In an internal combustion engine, having cylinders arranged in two groups in two planes at an angle, a crankshaft with as many crankpins as cylinders, the axis of said crankshaft lying in the plane of one of the two cylinder groups, above the line of intersection of the planes of the two cylinder groups, said crankshaft having eight crankpins so arranged that crankpins 1 and 8, 2 and 7, 3 and 6, 4 and 5 reach their top or bottom positions simultaneously, one pair at the time.

37. In an internal combustion engine having cylinders arranged in two planes at an angle, having at least four cylinders in one plane and at least four in the other plane in staggered relation alternately, a crankshaft having its crankpins, as many as cylinders, symmetrically arranged with respect to one plane of symmetry perpendicular to said shaft, only two pistons reaching simultaneously their bottom or top positions at the time.

38. The combination of claim 37, in which the axis of said shaft is placed above the intersection of the planes of said cylinder groups and within it.

39. In an internal combustion engine having cylinders arranged alternately in two groups in two planes at an angle smaller than 720° divided by the number of cylinders, a crankshaft having as many crankpins as cylinders, said crankpins symmetrically arranged with respect to not more than two planes of symmetry perpendicular to said shaft.

40. The combination of claim 39, in which the axis of said shaft is placed above the line of intersection of said cylinder planes and within and not on said planes towards said cylinder groups, in order to shorten the length of the connecting rods and to improve the balance of the reciprocating parts.

41. The combination of claim 39, in which said crankpins are further so arranged, and said crankshaft so placed that no two pistons, one in each group, will reach their top position simultaneously.

JEAN A. H. BARKEIJ.